Dec. 18, 1951   H. I. MANDOLF ET AL   2,578,978
VARIABLE TENSION DRAG FOR FISHING REELS
Filed March 25, 1946
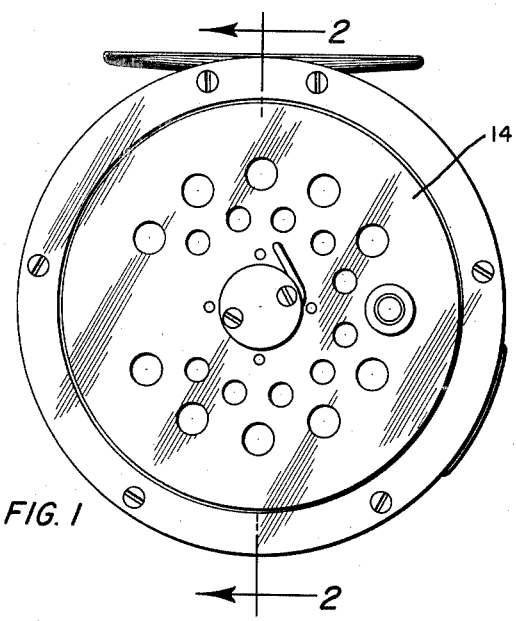
FIG. 1
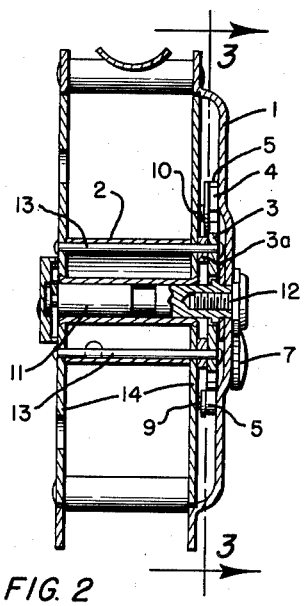
FIG. 2
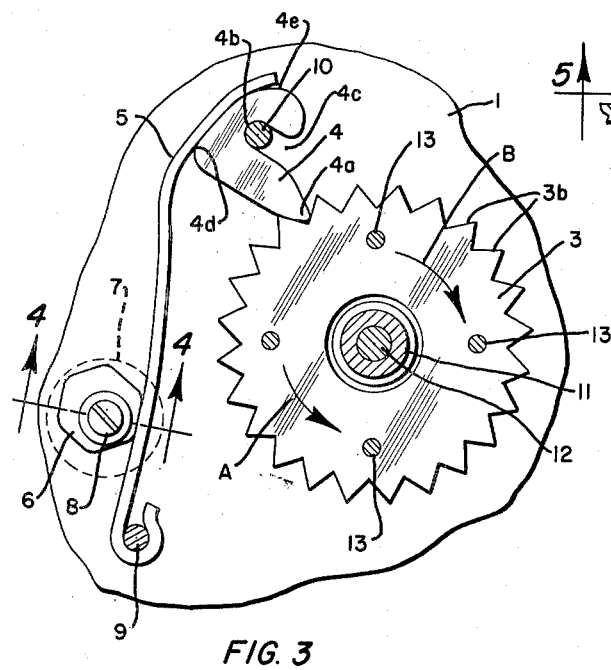
FIG. 3
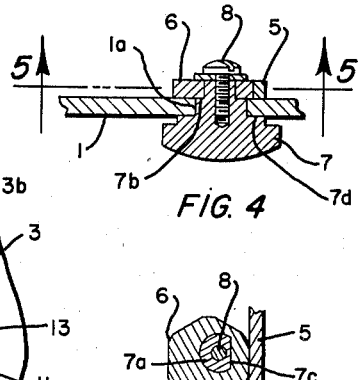
FIG. 4
FIG. 5
INVENTOR.
HENRY I. MANDOLF &
SHERWOOD W. BAKER
BY
A. B. Bowman
ATTORNEY Patented Dec. 18, 1951

2,578,978

UNITED STATES PATENT OFFICE 2,578,978

VARIABLE TENSION DRAG FOR FISHING REELS

Henry I. Mandolf and Sherwood W. Baker, San Diego, Calif.

Application March 25, 1946, Serial No. 656,838

4 Claims. (Cl. 242—84.6)

Our invention relates to a variable tension drag for fishing reels for use in adjusting the amount of drag imposed in connection with the spool of the fishing reel and the objects of our invention are:

First, to provide a variable tension drag of this class in which the drag is greater in one direction than in the other direction when the spool is rotated;

Second, to provide a variable tension drag for fishing reels in which a cam and pawl member engageable with the drag wheel is engaged by a variable tension spring whereby the leverage of said cam and pawl member is greater in relationship to its engagement with said variable tension spring in one direction of movement than it is when moved in the opposite direction with relation to said variable tension spring, thereby imposing greater resistance to the movement of the drag wheel in one direction of rotation than it does in the opposite direction of rotation of said drag wheel;

Third, to provide a variable tension drag for fishing reels of this class in which a tension spring is loaded intermediate its ends by an eccentric tension adjustive member providing a very easily controlled loading arrangement for the tension spring;

Fourth, to provide a variable tension drag of this class in which a hexagonal tension adjustment member is eccentrically rotatably mounted and engageable with the tension spring associated therewith, whereby the flats of the hexagonal tension adjustment member provide detent means for holding the same in adjusted relation with the tension spring; and Fifth, to provide a variable tension drag for fishing reels of this class which is very simple and economical of construction efficient in its action, and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a side elevational view of a fishing reel; Fig. 2 is a sectional view thereof taken from the line 2—2 of Fig. 1 showing our variable tension drag mechanism in connection therewith; Fig. 3 is an enlarged fragmentary sectional view taken from the line 3—3 of Fig. 2; Fig. 4 is a fragmentary sectional view taken from the line 4—4 of Fig. 3; and Fig. 5 is a fragmentary sectional view taken from the line 5—5 of Fig. 4.

Similar characters of reference refer to similar parts and portions throughout the several views of the drawings:

The frame 1, spool 2, drag wheel 3, cam and pawl member 4, spring 5, tension adjusting member 6, control handle 7, screw 8, pins 9 and 10, shaft 11, screw 12, shafts 13, and the spool side plates 14 constitute the principal parts and portions of our variable tension drag for fishing reels.

The frame 1 of the fishing reel as shown in Figure 2 of the drawings supports the shaft 11 connected thereto by the screw 12. The spool 2 of the reel is assembled by means of the shafts 13 extending through the side plates 14, and the drag wheel 3 all as shown best in Figures 2 and 3 of the drawings. As shown in Figure 2 of the drawings, a spacer member 3a is provided intermediate the drag wheel 3 and one of the side plates 14 of the spool 2. The drag wheel 3 is provided with teeth 3b at its periphery engageable with the pawl portion 4a of the cam and pawl member 4. This cam and pawl member 4 is provided with a bearing portion 4b engageable with the pin 10 secured in connection with the frame 1. It will be noted that the bearing portion 4b is opposed by an opening 4c in the cam and pawl member 4 for readily removing the same from the pin 10 as desired. The cam and pawl member 4 is actuated by rotative movement of the drag wheel 3. When the drag wheel 3 is moved in the direction as indicated by the arrow A in Figure 3 of the drawing, the cam portion 4d of the cam and pawl member 4 bears against the tension spring 5 at which point considerable leverage is apparent with respect to the axis of the pin 10 creating greater drag in connection with the teeth 3b of the drag wheel 3 than is the case when the drag wheel 3 is rotated in the direction as indicated by the arrow B in Fig. 3 of the drawings, whereupon the cam portion 4e of the cam and pawl member 4 engages the tension spring 5. It being noted that the leverage from the center of the pin 10 to the cam portion 4e is less than the leverage from the center of the pin 10 to the cam portion 4d, thus when the spool 2 is rotated in the direction as indicated by the arrow A the line on the spool 2 is being paid out. When winding the line backwardly onto the spool the spool 2 rotates in the direction as indicated by the arrow B in Figure 3 of the drawings carrying with it the drag wheel 3 which then operates with reduced drag. It is thus obvious that the cam and pawl member 4 imposes greater drag in connection with the teeth 3b of the drag wheel 3 when operated in one direction than it does when operated in the opposite direction. In this manner, a fish taking line away from the reel must overcome the excessive drag imposed by the cam and pawl member 4 in connection with the drag wheel 3 while the operator of the reel winds the line backwardly onto the reel, resisted by the reduced drag due to the variety of leverage provided by the cam and pawl member 4 in its engaged relation with the tension spring 5. The tension spring 5 at its opposite end from the cam and pawl member 4 is rotatably secured in connection with the pin 9 which is anchored to the frame 1. The tension adjusting member 6 is preferably hexagonal in form and is eccentrically mounted in connection with the shaft portion 7a of the control handle 7 which extends through the side wall of the frame 1 as shown best in Figures 4 and 5 of the drawings. The screw 8 is screw threaded into the shaft 7a of the control handle 7 and secures the tension adjusting member 6 in engaged relation with the shoulder portion 7b of the control handle 7 as shown best in Figure 4 of the drawings. It will be here noted that the shaft portion 7a of the control handle 7 is provided with a flat portion 7c arranged to fix the tension adjusting member 6 on the shaft portion 7a against rotation thereon as shown in Figure 2 of the drawings. The control handle 7 projects outwardly of the frame 1 and is readily grasped by the fingers of the operator. The hexagonal form of the tension adjusting member 6 in its eccentric relation with the shaft portions 7a of the control handle 7 provides means for varying the lateral deflection of the tension spring 5 for increasing its bearing pressure on the cam and pawl member 4. As shown in Figure 3 of the drawings the tension adjusting member 6 is so arranged that a minimum tensional adjustment is made, however, 6 different flats of the tension adjusting member provide 6 different degrees of tension in the tension spring 5 for varying the resistance to the movement of the cam and pawl member 4 by the teeth 3b of the drag wheel 3. As shown in Figure 4 of the drawings the shoulder portion 7b of the control handle 7 in opposed relation to the shoulder portion 7d thereof, provides operating tolerance for the control handle member 7 rotating within the opening 1a of the frame 1.

The operation of our variable tension drag for fishing reels is substantially as follows:

When the spool 2 supports line thereon, and a fish is securely hooked in connection with the line and carries the line outwardly, the drag wheel 3 operates in the direction as indicated by the arrow A in Figure 3 of the drawings, whereupon the cam portions 4d of the cam and pawl members 4 bears against the tension spring 5 which resists the movement of the cam and pawl member 4 imposing a load on the fish in connection with the line. It being noted that the drag in the direction as indicated by the arrow A is greater than in the opposite direction indicated by the arrow B. This provides for ease in reeling in the line and increased drag in connection with the fish when paying the line out. Leverage of the cam and pawl member 4 at its cam portion 4e is shorter than the leverage from the cam portion 4d to the axis of the pin 10. When it is desired to increase or decrease the drag in connection with the drag wheel 3, the control handle 7 is rotated engaging the desired flat of the hexagonal tension adjusting member 6 with the tension spring 5. The eccentric relationship of the tension adjusting member 6 with the shaft portion 7a of the control handle 7 provides for variation of lateral deflection of the spring 5 as desired, which causes resultant varying pressure on the cam and pawl member 4 for resisting the movement thereof by the teeth 3b of the drag wheel 3. The tension spring 5, when in operation, is not restrained at the pin 9, but is free to rotate thereon permitting the intermediate portion of the spring 5 to deflect readily in response to adjustment of the tension adjusting member 6, providing a spring of this class which is very durable and so designed that it is not subject to undue fatigue in any particular portion thereof. The assembly of the cam and pawl member 4 with the pin 10 is facilitated by the opening 4c at one side of the bearing portion 4b permitting the operator to deflect the spring 5 and place the cam and pawl member 4 on the pin 10 by slightly rotating same into position. All is shown best in Figure 3 of the drawings.

Though we have described and shown the particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention what we claim as new and desire to secure by Letters Patent is:

1. In a variable tension drag for fishing reels of the class described, the combination of a fishing reel having a frame and a rotating spool, a drag wheel in connection with said rotating spool having teeth about the periphery thereof, a cam and pawl member pivotally mounted in connection with said frame and engageable with said drag wheel, a spring engaging said cam and pawl members near one end of said spring, said cam and pawl member having separate cam portions engageable with said spring when pivoted in opposite directions over the axis of said cam and pawl member in connection with said frame, the leverage from the axis of said cam and pawl member varying in length to the various bearing portions of said cam and pawl member with respect to said spring, the opposite end of said spring supported in connection with said frame and an eccentric tension adjusting member bearing on said spring intermediate the ends of said spring.

2. In a variable tension drag for fishing reels of the class described, the combination of a fishing reel having a frame and a rotating spool, a drag wheel in connection with said rotating spool having teeth about the periphery thereof, a cam and pawl member pivotally mounted in connection with said frame and engageable with said drag wheel, a spring engaging said cam and pawl member near one end of said spring, said cam and pawl member having separate cam portions engageable with said spring when pivoted in opposite directions over the axis of said cam and pawl member in connection with said frame, the leverage from the axis of said cam and pawl member varying in length to the various bearing portions of said cam and pawl member with respect to said spring, the opposite end of said spring supported in connection with said frame and an eccentric tension adjusting member bearing on said spring intermediate the ends of said spring, said tension adjusting member having flats thereon arranged to operate as detents in engagement with said spring.

3. In a variable tension drag for fishing reels of the class described, the combination of a fishing reel having a frame and a rotating spool, a drag wheel in connection with said rotating spool having teeth about the periphery thereof, a cam and pawl member pivotally mounted in connection with said frame and engageable with said drag wheel, a spring engaging said cam and pawl member near one end of said spring, said cam and pawl member having separate cam portions engageable with said spring when pivoted in opposite directions over the axis of said cam and pawl member in connection with said frame, the leverage from the axis of said cam and pawl member varying in length to the various bearing portions of said cam and pawl member with respect to said spring, the opposite end of said spring supported in connection with said frame and an eccentric tension adjusting member bearing on said spring intermediate the ends of said spring, said tension adjusting member having flats thereon arranged to operate as detents in engagement with said spring, a control handle member at the outer side of said frame having a shaft portion extending therethrough in connection with said tension adjusting member.

4. In a variable tension drag for fishing reels of the class described, the combination of a frame member, a spool rotatably mounted in connection with said frame member, a drag wheel having teeth at its periphery connected with said spool, a cam and pawl member pivotally connected with said frame and engageable with said drag wheel, a spring connected at one end to said frame and engaging said cam and pawl member near its opposite end and a tension adjusting member bearing on said spring intermediate its ends arranged to deflect the same laterally, said tension adjusting member being an eccentric member having flat portions thereon arranged to operate as detents in connection with said spring, said cam and pawl member having extended cam portions engageable with said spring varying in distance from the axis of said cam and pawl member.

HENRY I. MANDOLF.
SHERWOOD W. BAKER.

REFERENCES CITED

The following references are of record in the file of this patent:

UNITED STATES PATENTS

| Number | Name | Date |
|---|---|---|
| 1,024,739 | Murgas | Apr. 30, 1912 |
| 1,730,332 | Pflueger | Oct. 1, 1929 |
| 1,901,091 | Fawcett | Mar. 14, 1933 |
| 2,340,892 | Maynes | Feb. 8, 1944 |
| 2,457,323 | Sharps | Dec. 28, 1948 |

FOREIGN PATENTS

| Number | Country | Date |
|---|---|---|
| 2,402 of 1901 | Great Britain | Jan. 23, 1902 |
| 20,908 of 1935 | Australia | Jan. 23, 1936 |
| 422,873 | Great Britain | Jan. 21, 1935 |